(12) United States Patent
Morita et al.

(10) Patent No.: US 7,735,660 B2
(45) Date of Patent: Jun. 15, 2010

(54) POROUS MULTILAYERED HOLLOW FIBER AND FILTRATION MODULE, AND METHOD OF MANUFACTURING POROUS MULTILAYERED HOLLOW FIBER

(75) Inventors: Tooru Morita, Osaka (JP); Kiyoshi Ida, Osaka (JP); Hajime Funatsu, Osaka (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 1118 days.

(21) Appl. No.: 10/684,836

(22) Filed: Oct. 15, 2003

(65) Prior Publication Data

US 2004/0118772 A1 Jun. 24, 2004

(30) Foreign Application Priority Data

Oct. 23, 2002 (JP) .............................. 2002-308606

(51) Int. Cl.
*B01D 63/02* (2006.01)
*B01D 63/04* (2006.01)
*B01D 61/00* (2006.01)

(52) U.S. Cl. ............................ 210/500.23; 210/500.36; 210/321.87; 210/321.78; 210/490; 264/639; 264/643; 428/109; 156/494; 156/496

(58) Field of Classification Search ........................ None
See application file for complete search history.

(56) References Cited

FOREIGN PATENT DOCUMENTS

| JP | 60-61018 A | 4/1985 |
|---|---|---|
| JP | 60-172306 | 9/1985 |
| JP | 61-422 A | 1/1986 |
| JP | 63028406 A * | 2/1988 |
| JP | 04-3607 | 2/1992 |

(Continued)

OTHER PUBLICATIONS

English translation of JP-03-221095.*

(Continued)

*Primary Examiner*—Krishnan S Menon
(74) *Attorney, Agent, or Firm*—McDermott Will & Emery LLP

(57) ABSTRACT

A porous multilayered hollow fiber for outer side pressed filtration is made of a multilayer comprising a supporting layer constituted of the thickness of an expanded porous polytetrafluoroethylene tube, and a filtration layer provided on the outer surface of the supporting layer, wherein pores surrounded by fibrous frameworks in the filtration layer are smaller than those of the supporting layer, and the mean of the maximum fibril length (L) of the fibrous frameworks surrounding each pore in the outer surface of the filtration layer is designed to be small such that (X) and (Y) fall within the range on the XY plane, where (X) is a particle diameter of particles captured when the particle trapping ratio is equal to or more than 90% in the case where the filtration is done under an elevated pressure of 0.1 MPa, and (Y) is a value designated as RFL obtained by dividing (L) by (X). Thus, the degradation of flow rate due to the elapse of time can be prevented, since solid particles to be separated do not enter into pores, and clogging and blockade of the pores do not occur even in the case of filtering a solution of high turbidity. As a result, it is possible to recover filtration property easily by performing back-wash reverse filtration and to maintain excellent filtration property for a long time.

4 Claims, 12 Drawing Sheets

Particle diameters of captured particles

FOREIGN PATENT DOCUMENTS

| | | |
|---|---|---|
| JP | 4-40222 | 2/1992 |
| JP | 04-75044 | 11/1992 |
| JP | 4-75044 | 11/1992 |
| JP | 6-126113 | 5/1994 |
| JP | 7-171360 | 7/1995 |
| JP | 9-108671 A | 4/1997 |
| JP | 2000107758 A  * | 4/2000 |
| JP | P3221095 | 8/2001 |

OTHER PUBLICATIONS

Office Action issued in corresponding Japanese Application No. 2002-308606 dated Apr. 11, 2006.

Japanese Office Action issued in Japanese Patent Application No. JP 2005-187370, dated Apr. 1, 2008.

* cited by examiner

Particle diameters of captured particles

POROUS MULTILAYERED HOLLOW FIBER AND FILTRATION MODULE, AND METHOD OF MANUFACTURING POROUS MULTILAYERED HOLLOW FIBER

BACKGROUND OF THE INVENTION

1. Field of the Invention

The present invention relates to porous multilayered hollow fibers and a filtration module having the porous multilayered hollow fibers, and a method of manufacturing the porous multilayered hollow fibers. Particularly, the invention relates to the improvement of filtration properties of porous multilayered hollow fibers which are composed of porous tubes such as the polytetrafluoroethylene and which are used in filtration equipment for solid-liquid separation treatment in the fields of environmental preservation, pharmacy, and foods.

2. Background Art

Porous materials consisting of polytetrafluoroethylene have characteristics such as nonstickiness and low coefficient of friction in addition to excellent chemical resistance, heat resistance, weather resistance, fire resistance, etc. Also, because of their porous structure, they exhibit not only excellent permeability and flexibility but also superior performance in catching and filtration of fine particles. In the past, therefore, the materials consisting of polytetrafluoroethylene have been used extensively in the fields such as filtration of precision chemical medicines, and filters for drainage processing.

More specifically, the porous polytetrafluoroethylene materials are shaped into a tubular or sheet form and used for various filters, deaerator membranes, waterproof membranes, etc., since they have microscopic fibrous texture in which fibrils are interconnected in the form of a three-dimensional network such that numerous pores exist surrounded with fibrous frameworks, which are constituted of nodes and fibrils. Also, it is possible to make a filtration module for solid-liquid separation treatment by bunching plurality of tubes made of such porous polytetrafluoroethylene into a modularized form.

Various proposals have been made for achieving high filtration property of porous polytetrafluoroethylene filtration materials to be used in such filtration module.

For example, Japanese Patent Application Publication H4-75044B discloses a tubular filter in which an attempt is made to achieve filtration property with a continuous porous film made of polytetrafluoroethylene and to improve the tube strength by wind-covering the film on the outer surface of a continuous porous tube made of polytetrafluoroethylene. In addition, a tubulous filter in which a porous film has filtration property to remove minute particles of 0.1 μm or more is proposed.

Japanese Utility Model Application Publication H4-3607 proposes a tubular filter which filters fluid from its inner side to outer side and which is constituted of a porous polytetrafluoroethylene tube, a porous polytetrafluoroethylene film whose pore size is smaller than that of the tube, and a reinforcement knit layer of polytetrafluoroethylene yarn. The film is spirally wound, extending in the axial direction, over the outer surface of the tube, and the reinforcement knit layer is provided on the outer surface of a layer made of such wound film.

Moreover, in Japanese Patent No. 3221095 the present applicant has proposed a porous multilayered hollow fiber in which a fluid-permiable sheet such as a porous polytetrafluoroethylene sheet is fixed on the inner surface of a porous polytetrafluoroethylene tube by hot-melt adhesion.

A drawback of the tubulous filter disclosed in Japanese Patent Application Publication H4-75044B is that the filtration performance deteriorates with the elapse of time because pores of the porous film are gradually filled with particles as a result of hours of usage, although the filter has a function of removing minute particles of 0.1 μm or more.

That is, the filter is structured such that minute particles are not removed at the surface of the porous film, but 0.1 μm minute particles are removed by the porous film as a whole, since the pores of the film capture the minute particles when they pass inside the pores, which are designed to be relatively large enough to attain a flow rate of some degree. Therefore, although it is excellent in terms of the filtration property in the initial stage of the usage, its shortcoming is that such good filtration property cannot be maintained for a long time because the clogging occurs with the elapse of time, resulting in the degradation of the filtration property. Particularly, it is disadvantageous in the case of filtering a high-turbidity solution, because rapid clogging occurs.

Generally, the performance of porous materials is determined by filtration precision in terms of their efficiency of collecting the prescribed particles, because it is difficult to define the size of the pores, which are formed with entangled fibrils and are varied in shape and size.

According to Japanese Utility Model Application Publication H4-3607 B filtration is done outwardly from the inner surface of a tube having relatively greater pore sizes such that pre-filtration is accomplished therewith and the precision of filtration is secured with the wound film layer. In the case of filtering a liquid of high turbidity, however, large particles that cannot go out to the outer side clog the pores of the inner layer of the porous tube which performs pre-filtration. Therefore, such clogging deteriorates permeability of liquid. Also, the reinforcement knit layer of yarn provided as the outermost layer does not contribute to the filtration property but deteriorates the flow rate because particles enter into the knit layer.

Thus, the important matter of the membrane filter using a porous material is not only the initial flow rate but also the prevention of degradation in the flow rate due to the clogging caused by solid particles over the elapse of time. That is, what is important is the filtration property in a steady state after some elapse of time in usage.

According to Japanese Patent No. 3221095 the filtration property in a porous multilayered hollow fiber for filtering outward from inner side is improved by unifying the inner side of a tube with a lapped porous sheet having small pore size and high porosity. However, the filtration property is insufficient for filtering liquid of high turbidity because blockage occurs inside a channel. Thus, further improvement is needed.

In filtration using such porous polytetrafluoroethylene tubes, back wash reverse filtration is generally performed to remove particles adhered to the pores or internal surface of the tubes so that the filtration life may be extended. However, in the case where particles are captured not at the surface of the filtration layer but through the whole filtration layer including the thickness of the tubes, particles that have entered into the pores of the porous tubes cannot be removed easily by the back wash reverse filtration. Therefore, the recovery of the filtration property is difficult.

In order to prevent particles from entering into the pores of the porous tubes or the like, it might be considered to decrease the pore size at the surface. In that case, however, the porosity is also reduced inevitably because the expansion ratio is decreased. Thus, the disadvantage is that the permeability for fluid is degraded.

The drawback of such porous polytetrafluoroethylene tubes as described above is that their durability with respect to inner or outer pressure, bending, etc. is insufficient because they are formed such that a polytetrafluoroethylene sheet is simply wound on the plain polytetrafluoroethylene tube. In order to improve the durability, knitting and braiding are made for reinforcement, but such reinforcement is disadvantageous because the flow rate decreases since particles (suspended solid particles) accumulates therein.

SUMMARY OF THE INVENTION

The present invention was made in view of the problems described above, and an object of the invention is to provide porous multilayered hollow fibers and filtration modules in which clogging due to solid particles does not occur in the pores of porous materials and which can maintain excellent filtration property for a long time even if a high turbidity solution is filtered. According to the invention, the degradation of the flow rate due to the elapse of time can be prevented and the filtration property can be recovered easily by back wash reverse filtration. Another object of the present invention is to provide a method of manufacturing a porous multilayered hollow fiber whose durability is improved with respect to inner or outer pressure and the bending of its porous membrane.

In order to achieve the above-mentioned objects, a porous multilayered hollow fiber for outer side pressed filtration according to the present invention, in which solid-liquid separation treatment is performed from the outer surface side thereof toward the internal surface side, comprises a supporting layer, which is the thickness of an expanded porous polytetrafluoroethylene tube, and a filtration layer provided on the outer surface of the supporting layer. The pores surrounded by fibrous frameworks, which are formed of nodes and fibrils, in the filtration layer are smaller than those of the supporting layer, and the mean of the maximum fibril length (L) of the fibrous frameworks surrounding the pores in the outer surface of the filtration layer is designed such that (X) and (Y) fall within the range defined by plotting the following 10 points on the XY plane, where (X) is a particle diameter of particles captured when the particle trapping ratio is equal to or more than 90% in the case where the pressure filtration is done under an elevated pressure of 0.1 MPa, and (Y) is a value obtained by dividing (L) by (X), which value is designated as RFL (i.e., Relative Fibril Length), that is, (Y=L/X): (X, Y)= (0.055, 2) (1, 1.5) (2, 1) (5, 0.5) (10, 0.3) (10, 4) (5, 6) (2, 10) (1, 15) (0.055, 25).

A filtration module according to the present invention is formed of a bundle made by bundling a plurality of porous multilayered hollow fibers of the present invention and can be used for outer side pressed filtration or dip-type outer side pressed suction filtration.

According to a manufacturing method of the present invention for making a porous multilayered hollow fiber, a porous expanded resin sheet is wound around the outer surface of a porous expanded polytetrafluoroethylene tube, which outer surface has been processed to be uneven, and the porous expanded polytetrafluoroethylene tube and the porous expanded resin sheet are adhered together by a load provided thereto after or during such winding process, and such adhered tube and resin sheet are sintered and united into a unified body.

According to the present invention, in a porous multilayered hollow fiber used for the outer side pressed filtration, in which the outer layer functions as a filtration layer, the maximum cross-dimension of pores existing in the outer surface of the filtration layer is designed to be suitably small such that solid particles to be separated can be easily removed from the pores by the back wash reverse filtration, not being irreversibly captured in the pores, in a steady state after the early stage of the solid-liquid separation treatment. That is, the maximum cross-dimension of pores is designed such that numerous solid particles in a solution can be blocked at the surface of the filtration layer, and solid particles do not enter into the pores in the filtration layer and the supporting layer. Therefore, most of the solid particles can be repulsed at the outer surface of the filtration layer, and it is possible to prevent the solid particles from entering into the pores in the filtration layer and the supporting layer.

Thus, the degradation of the flow rate due to the elapse of time can be prevented, since solid particles do not enter into pores, and clogging and blockade of the pores do not occur even in the case of filtering a solution of high turbidity which includes solid particles of various shapes and sizes in wide distribution, particularly a solution including solid particles whose average particle diameter is large.

As a result, it is possible to maintain excellent filtration property for a long time after reaching a steady state; there occurs little variation of flow rate between the early stage and the steady state. Moreover, recovery of the filtration property can easily be achieved by performing back-wash reverse filtration, air-diffusion, medicine-wash, or the like because adherent solid particles can be removed easily. Thus, the porous multilayered hollow fiber of the present invention is suitable for use in a filter which is used for a long period on the order of several months or several years.

Moreover, since the supporting layer and the filtration layer are united firmly by fusion, the porous multilayered hollow fiber can, for a long time, endure mechanical load caused by the back wash reverse filtration, the air diffusion, etc. Also, because the porous multilayered hollow fiber is made of a material having excellent chemical resistance, such as polytetrafluoroethylene, it can be applied to the filtration of a solution including a strong acid, strong alkali, or the like. It has also excellent heat resistance.

According to the manufacturing method of the present invention, since the outer surface of a porous expanded polytetrafluoroethylene tube is afforded unevenness, the displacement between the tube and a sheet that is wound around the outer surface of the tube can be prevented, and the sheet can be prevented from floating because a load is applied during or after lapping the sheet on the tube. Moreover, the tube and sheet can be firmly melt-united because the tube and the sheet which have been partially unsintered are sintered in the state where their adherence is enhanced at a temperature above the melting point. Thus, the sufficient durability to inner or outer pressure, bending, etc. can be obtained.

Furthermore, the filtration module of the present invention, which uses the porous multilayered hollow fibers of the present invention, can perform filtration of high precision and has excellent durability, and can be used advantageously for outer side pressed filtration or dip-type suction filtration. Thus, it can be used suitably for the removal of molds and turbid substances (the purification of enzyme and amino acid) in the fermentation process, the culture of animal cell, pharmacy, fermentation and food fields, high-turbidity drainage process, environmental preservation field such as the processing of waste acid and waste alkali, and the like.

More specifically, it can be used for fluid-solid separation in drainage processing, industrial drainage processing (fluid-solid separation), the filtration of industrial service water, pool water filtration, river water filtration, seawater filtration, irrigation water filtration, filtration of service water in food industry, filtration for clarifying of products, filtration of service water and dyestuff solution in dyeing industry, filtration of liquor, beer, wine and the like (raw products in particular), microorganism separation from a fermentor in pharmacy and food industries, and the like, pre-treatment filtration for water purification process (including desalination of sea water) in reverse osmosis membrane, pre-treatment filtration in a process using an ion exchange membrane, pre-treatment filtration in water purification process using an ion exchange resin, and so on.

BRIEF DESCRIPTION OF THE DRAWINGS

FIG. 2(A) is a cross-section of the fiber, and FIG. 2(B) is a perspective view of the fiber.

DETAILED DESCRIPTION OF THE INVENTION

Figure 1:
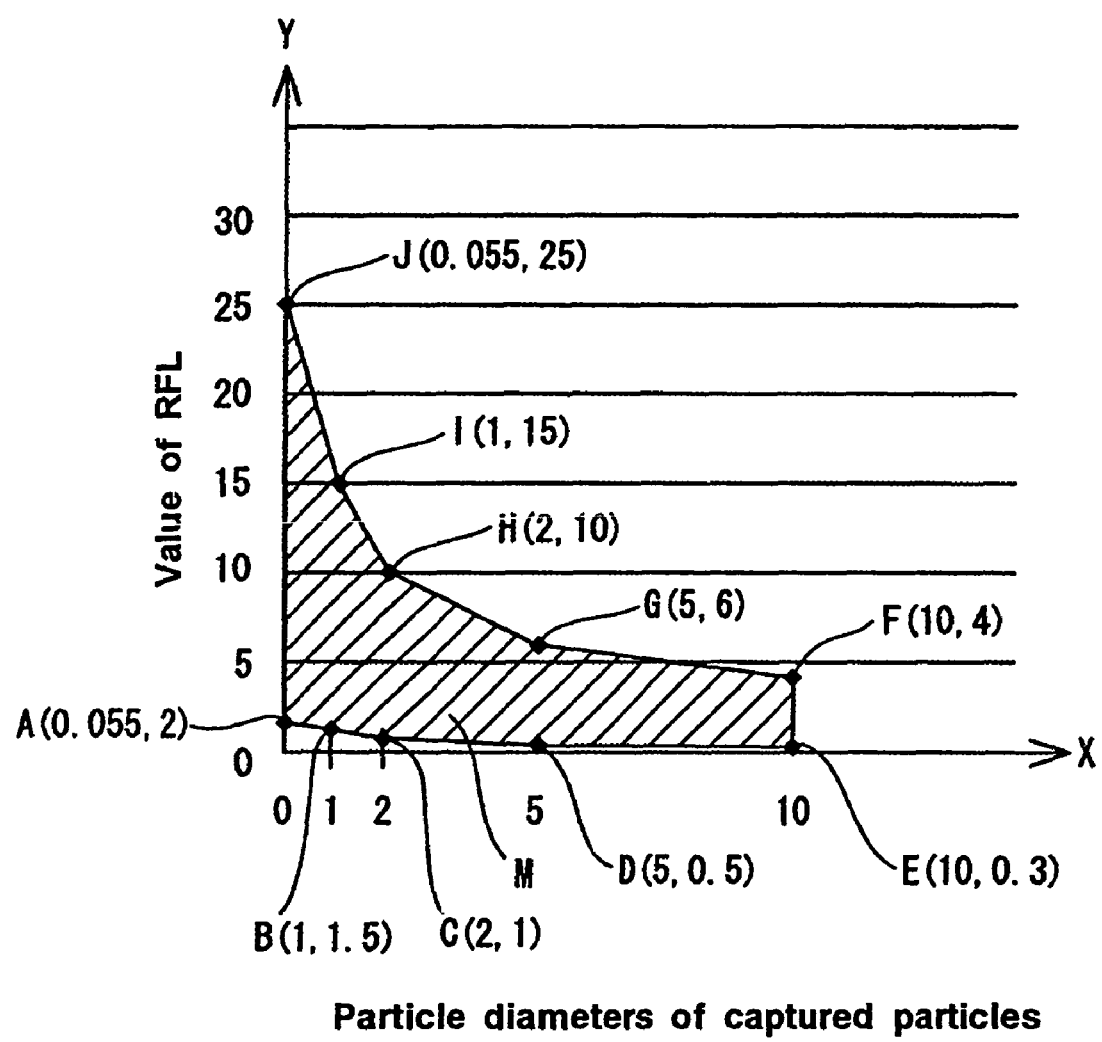
FIG. 1 shows the relationship between. (X, Y) and the region M, where (X) is a particle diameter of captured particles in the case where the particle trapping ratio is equal to or more than 90% when filtration is performed at an elevated pressure of 0.1 MPa, (Y) is RFL (i.e., Relative Fibril Length), which is a value obtained by dividing (L) by (X), where (L) is an average maximum fibril length of the fibrous framework that surrounds each pore in the outer surface of the filtration layer.

As a result of intensive research, the present inventor has found that the clogging of pores in a porous material is caused by solid particles, mostly depending on the maximum cross-dimensions of numerous pores existing surrounded with the fibrous frameworks in the filtration surface, which is the outermost surface portion of the filtration layer. Also, it was found that the flow rate in a steady state after some elapse of time as well as the flow rate in an initial stage was important to achieve satisfactory filtration property for a long period of time.

That is, the expanded porous material such as the above-mentioned polytetrafluoroethylene material has microscopic fibrous texture in which flexible fibers are connected in three-dimensional network and numerous pores surrounded by fibrous frameworks exist. It was found that in order to secure separation of solids from liquid, it is better to control the maximum cross dimension of pores rather than the average pore size and porosity of pores which exist in the filtration layer, since many of the pores surrounded by the fibrous frameworks have slender shape such as a slit form. Particularly, the maximum cross dimension of pores in the outer surface of the filtration layer is important, and the filtration layer is structured such that solid particles are blocked at the surface of the filtration layer. The term "maximum cross dimension of a pore" as used herein means the maximum cross dimension of the spatial part which constitutes a pore, that is, the maximum length that links, across a cross-section, two points on the outer periphery of a pore which is formed by a resin part and fibrils connected thereto.

In a conventional porous membrane filter, a filtration layer has some degree of thickness so that particles can be captured in pores formed in a three-dimensional network through the whole filtration layer including the thickness thereof. Therefore, particles accumulate gradually in the pores over an elapse of time, causing clogging, which results in the degradation of the flow rate of the filtration layer as a whole. In contrast, in the porous multilayered hollow fiber for the outer side pressed filtration according to the present invention, in which an outer layer functions as a filtration layer, the mean of maximum fibril length (L) of the fibrous frameworks, each of which surrounds each pore in the surface of the filtration layer, is designed, as mentioned above, to be suitably small such that the solid particles to be separated in the steady state after the early stage of the solid-liquid separation treatment do not irreversibly enter into pores and can be easily removed by back wash reverse filtration or the like. In other words, it is set such that unreversible particle capture into pores in the filtration layer and the supporting layer does not substantially occur in a steady state where the degradation of flow rate at the early stage of the solid-liquid separation treatment to be performed at the best filtration pressure and back wash reverse filtration pressure has ended. Therefore, most of the solid particles can be repulsed at the outer surface in the filtration layer, and clogging does not occur, and consequently the permeability of liquid can be maintained.

That is, the structure of the filtration layer is defined such that RFL (Y) is a value obtained by dividing the mean of maximum fibril length (L) (μm) of fibrous frameworks, each of which surrounds a pore in the surface of the filtration layer, with particle diameter (X)(μm) of the captured particles in the case where the particle trapping ratio is equal to or more than 90% when filtration is performed under elevated pressure of 0.1 MPa. As a result of extensive experiments, the present inventor has found that solid particles to be separated are not captured into pores in the steady state after the early stage of the solid-liquid separation treatment and the filtration property can be enhanced when (L) is set such that (X) and (Y) fall within the region M that is surrounded with a line formed by linking 10 points of the following A to J on the XY plane as shown in FIG. 1: (X, Y)=A (0.055, 2), B (1, 1.5), C (2, 1), D (5, 0.5), E (10, 0.3), F (10, 4), G (5, 6), H (2, 10), I (1, 15), J (0.055, 25)

In such case, even if a high turbidity solution is filtered, many solid particles can be blocked at the surface of the filtration layer, and solid particles do not enter into pores in the filtration layer and the supporting layer. Therefore, the pores are not blockaded by dogging, and the filtering solution can penetrate into the filtration layer and the supporting layer, and consequently the degradation of flow rate due to the elapse of time can be prevented. Thus, there is little variation in the flow rate between the early stage condition and the steady state, and satisfactory filtration property can be maintained stably for a long time even after reaching the steady state.

Also, if some solid particles adhere to the surface of the filtration layer, such solid particles do not enter into the filtration layer and the supporting layer, and the adherent solid particles can be easily removed by performing back wash reverse filtration, allowing easy recovery of filtration property.

Generally, the shape of each pore surrounded by a fibrous framework is like a slit, which is elongated in one direction such as an axial direction. However, it may be of network structure, rhombic, elliptical, circular, etc., and can be changed appropriately by altering the expansion ratio, the processing method, or the like. Here, the mean maximum length of pores means the average of the maximum cross dimensions of pores in the outer surface in the filtration layer, and it can be measured on an image from scanning electron microscope (SEM) which magnifies an outer surface of the filtration layer.

The reason for adopting an outer side pressed filtration structure is that in the case of an internal pressure filtration structure, in which solid particles are blocked at the internal surface of the inner layer, solid particles which inevitably become to exist at high concentration in the hollow of the porous multilayered hollow fiber cause channel blockage and the flow rate of the hollow fiber is degraded when a high-turbidity solution is filtered.

Preferably, the filtration layer is a multi-layer consisting of the above-mentioned porous expanded polytetrafluoroethylene tube and a porous sheet produced by uniaxially or biaxially drawing a resin, the porous sheet being adherently wound on the outer surface of the tube.

The reason for adopting a structure of a wound sheet for the filtration layer, which is the outer layer, is that a porous sheet is easy to perform either a uniaxial drawing or biaxial drawing, allowing easy adjustment of shape and size of the pores in the surface, and it can be easily stacked as it is a thin film. Adopting an extrusion molded tube as a supporting layer, which is an inner layer, allows easy formation, thickness of sufficient strength, and high porosity. It is sufficient if the supporting layer and filtration layer are both expanded at least in one direction, and such expansion may be performed in the axial, circumferential, or radial direction of the tube. It may be performed in a uniaxial direction, or in two directions, i.e., axial and circumferential directions. The expansion ratio can be set appropriately as needed: in the case of an extrusion molded tube, 50%-700% for axial direction, and 5%-100% for circumferential direction; in the case of a porous sheet, 50%-1000% for longitudinal direction, and 50%-2500% for transverse direction. Particularly, when a porous sheet is used, it is possible to improve durability to membrane vibration due to air diffusion and pressure load due to back wash reverse filtration, because the strength of the circumferential direction can be improved when it is wound into a tubular form, since its expansion in the transverse direction is easy.

Moreover, excellent permeability can be attained because the filtration layer and the supporting layer consisting of a tube, which are made of porous expanded polytetrafluoroethylene, are unified such that their respective pores are communicated to each other three-dimensionally. One or more porous sheets may be wound in one layer or multi-layer to cover the whole outer surface of the tube made of porous expanded polytetrafluoroethylene such that no leakage occurs.

Preferably, the filtration layer is formed of a resin selected from the group consisting of polyolefin group resin, such as polytetrafluoroethylene, polyethylene, and polypropylene, and polyimide, poly vinylidene fluoride group resin. The above-mentioned resins are easy to subject to expansion processing, and superior in chemical resistance, and they can be formed into a body unified with polytetrafluoroethylene. Particularly, from the viewpoint of moldability with porous expanded polytetrafluoroethylene which constitutes a supporting layer, the filtration layer is also made of polytetrafluoroethylene, which is the material constituting a supporting layer.

Preferably, the mean maximum length of pores which exist in great numbers in the outer surface of the filtration layer is smaller than the mean maximum length of pores existing in great numbers, each surrounded by a fibrous framework, in the supporting layer: the mean maximum length of pores in the filtration layer is 1%-30% of the mean maximum length of pores in the supporting layer, and the smaller is the former, the better. Thus, the permeability from the outer surface side to the internal surface side can be enhanced.

Preferably, the areal occupation rate of the pores to the whole surface area of the filtration layer is 40%-60%, for example, according to image processing or the like. It is possible to efficiently improve the filtration property without decreasing flow rate even if the maximum cross dimension of pores is small, provided that the areal occupation rate of the pores is substantially great.

It is preferable that the porosity of the filtration layer is 50%-80%, and the porosity of the supporting layer is 50%-85%. In such case, the permeability from the outer surface side of the hollow fiber to the internal surface side can be more enhanced, keeping a balance with the strength thereof. The flow rate will easily be degraded if the porosity is too small, whereas the strength will easily decrease if the porosity is too great.

The thickness of the filtration layer is preferably 5 μm-100 μm. This is because if it is smaller than the above-mentioned range, formation of a filtration layer is difficult, and even if it is greater than the range, no improvement of the filtration property is expected. The thickness of the supporting layer is preferably 0.1 mm-10 mm. This enables to achieve satisfactory strength in all of the axial, radial, and circumferential directions, and it is possible to improve the durability to the inner or outer pressure, bending, etc. That inner diameter of the supporting layer is preferably 0.3 mm-10 mm.

The filtration module made of the porous multilayered hollow fibers of the present invention can be used in a manner such that a plurality of porous multilayered hollow fibers are bundled into a unit in which the gaps among the porous multilayered hollow fibers are sealed at their end by a sealing resin, and the bundled unit is housed in an outer pipe according to the need, and the gap between the outer pipe and at least one end of the bundled unit is similarly sealed by the sealing resin. Such bundled unit of porous multilayered hollow fibers of the present invention can preferably be used for outer side pressed filtration or dip-type outer side pressed suction filtration: the former is suitable in the case where the bundled unit is housed in an outer pipe; and the latter is suitable in the case where no outer pipe is employed for housing the bundled unit.

More specifically, it can be applied to filtration in general, and it is effectively used for processing of high turbidity drainage in particular. For example, it is possible to use in combination with activated carbon powder in a clean-water treatment. It is preferable that very minute dissolved organic matters be absorbed by an activated carbon powder and the activated carbon powder after absorbing such dissolved organic matters are filtered with the porous multilayered hollow fiber. In sewage purification, it is preferable that bacteria be propagated in a tank, into which sewage is introduced, and the bacteria dissolve pollutants in the sewage to dean, and then, the bacteria are filtered with the porous multilayered hollow fibers. In oil-water separation processing, removed oil exists as oil drops in a rinsing drainage (washing solution) of various machines and equipment. Also, there are cases in which a detergent mixes with such rinsing drainage and exists as emulsions. These can be filtered advantageously with the porous multilayered hollow fibers so as to collect and reuse.

The method of manufacturing the porous hollow fibers according to the present invention is capable of preventing the displacement of porous expanded polytetrafluoroethylene tube and porous expanded resin sheet by affording minute unevenness to the outer surface of the porous expanded polytetrafluoroethylene tube. It also can prevent the sheet from floating and enhance their adherence by providing a load onto the sheet during or after lapping thereof. The porous expanded polytetrafluoroethylene tube and porous expanded resin sheet may be sintered or unsintered. If they are not fully sintered, they can be united more firmly by sintering them in a state where they are well adhered together. Thus, sufficient durability to inner or outer pressure, bending, etc. can be achieved. Also, because the reinforcement layer such as a braiding, which may be clogged with solid particles, is not employed, there is no degradation of flow rate due to the elapse of time. By sintering the porous expanded polytetrafluoroethylene tube and the porous expanded resin sheet at a temperature above the melting point thereof, they can be melted and united more firmly.

The microscopic unevenness of the outer surface of porous expanded polytetrafluoroethylene tube is provided preferably by flame treatment. This enables attaining satisfactory unevenness without adverse influence on the property of the tube. The adherence may be enhanced by providing physical or chemical means, such as laser irradiation, plasma irradiation, or dispersion of fluorocarbon polymer group, such as tetrafluoroethylene-perfluoroalkylvinylether copolymer or perfluoroethylenepropylene copolymer. The microscopic unevenness may preferably be afforded to the outer surface of a porous expanded polytetrafluoroethylene tube; it may be about 20-200 μm and partially and intermittently provided.

As for the method of applying a load onto a porous expanded resin sheet during or after the winding thereof, one example is to pass the whole tube through a die after lapping the sheet, and it is sufficient if a suitable load is uniformly applied without causing the porous expanded polytetrafluoroethylene tube and porous expanded resin sheet to shift or to be damaged.

Hereinafter, an explanation of certain embodiments of the present invention is given, referring to the accompanying drawings.

Figure 2:
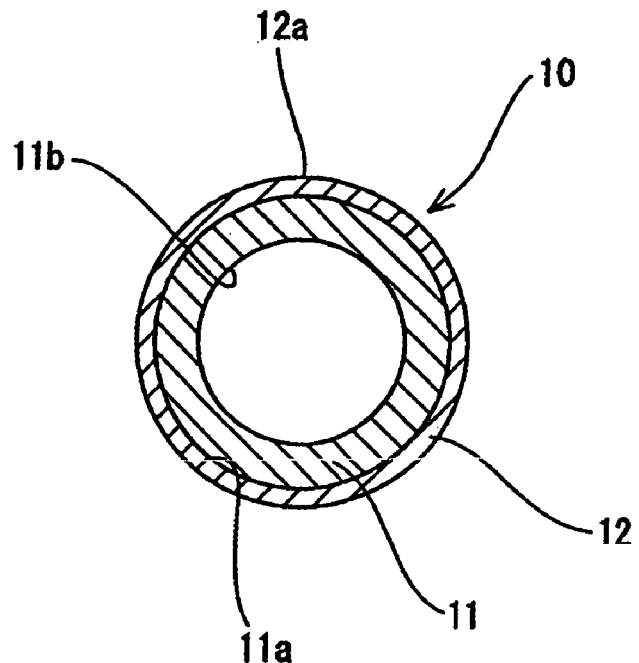
FIG. 2 is a schematic diagram illustrating the structure of a porous multilayered hollow fiber according to the present invention.
Figure 2:
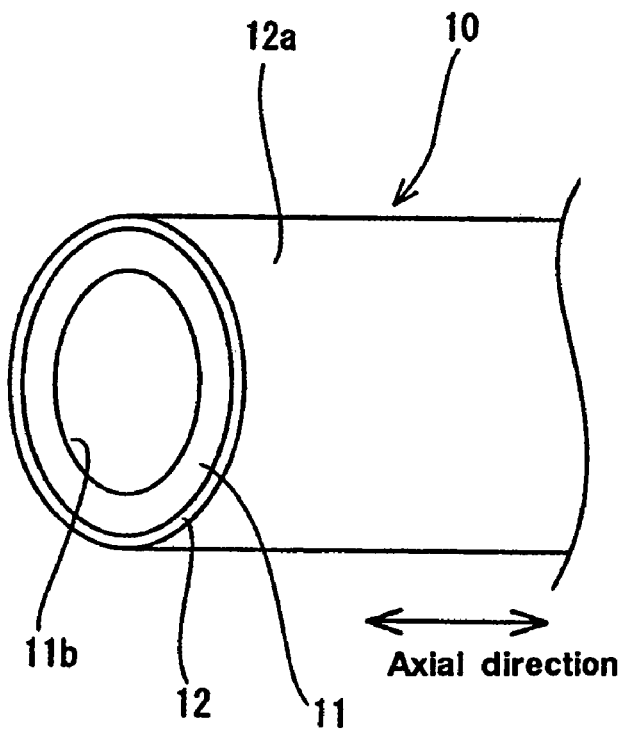
Figure 6:
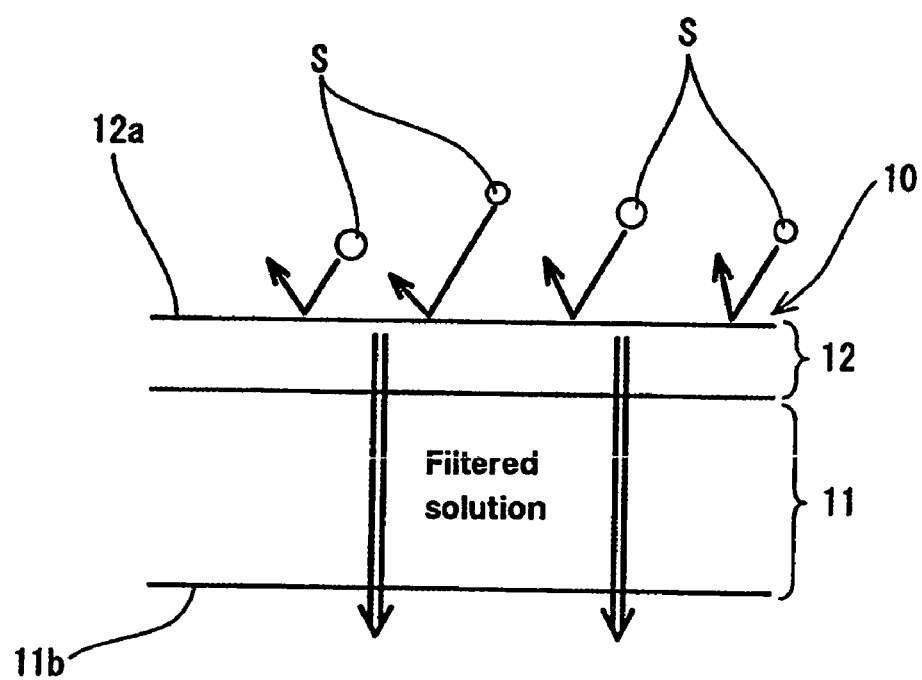
FIG. 6 is a schematic diagram showing a situation of filtration by the porous multilayered hollow fiber of the present invention.

FIG. 2 or FIG. 6 show an porous multilayered hollow fiber 10 according to first embodiment of the present invention.

The porous multilayered hollow fiber 10 consists of a multi-layer composed of supporting layer 11, which is the thickness of a porous expanded polytetrafluoroethylene tube, and a filtration layer 12 provided on the outer surface 11a of the supporting layer 11. More specifically, it has a unified structure of two layers consisting of the supporting layer 11, that is, the thickness of a tube made of porous expanded polytetrafluoroethylene by extrusion molding, and the filtration layer 12 made of a porous expanded polytetrafluoroethylene sheet, which is wound as the outermost layer on the outer surface 11a of the supporting layer 11. It is used for outer side pressed filtration such that solid-liquid separation treatment is performed toward the internal surface 11b side of the supporting layer 11 from the outer surface 12a side of the filtration layer 12 in the porous multilayered hollow fiber 10.

The filtration layer 12 and supporting layer 11, both of which are made of a porous polytetrafluoroethylene material, have a microscopic fibrous texture including flexible fibrils f, which are connected to one another in a three-dimensional network, and numerous pores 11A and 12A, which are surrounded by fibrous frameworks. The supporting layer 11 and filtration layer 12 are unified into a single body, in which the respective pores 11A and 12A are connected three-dimensionally, constituting a structure having permeability toward the internal surface 11b side of the supporting layer 11 from the outer surface 12a side of the filtration layer 12 in the porous multilayered hollow fiber 10.

Figure 3:
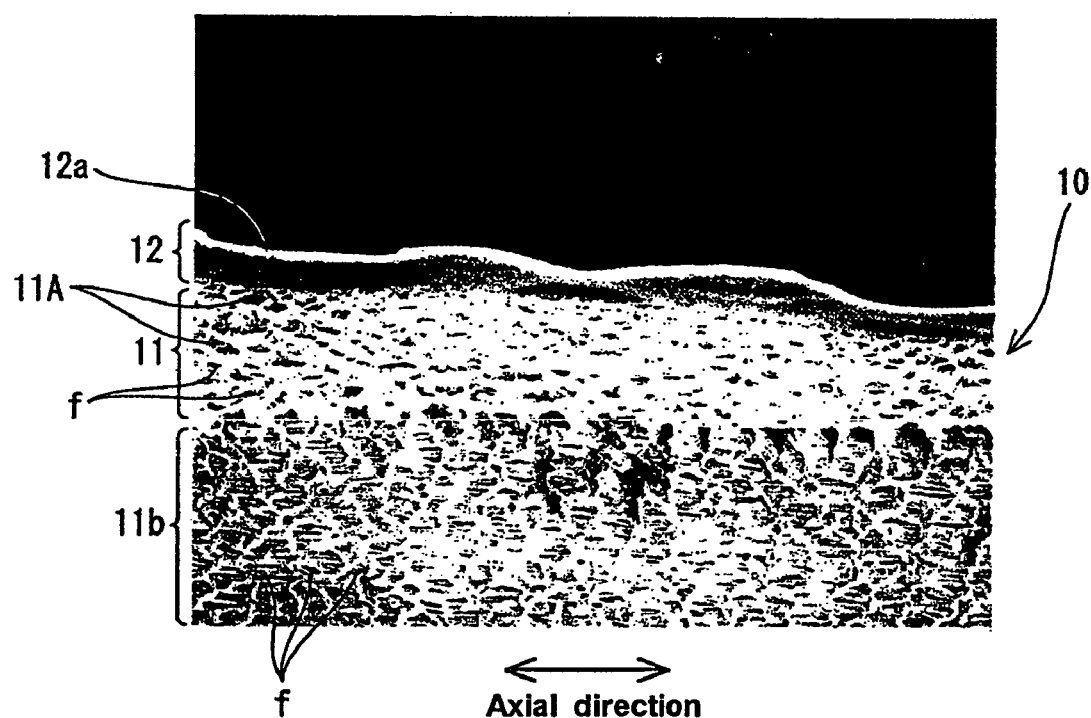
FIG. 3 is a magnified (100 times) photograph showing an axial cross-section of a porous multilayered hollow fiber, which is an example of the present invention.
Figure 4:
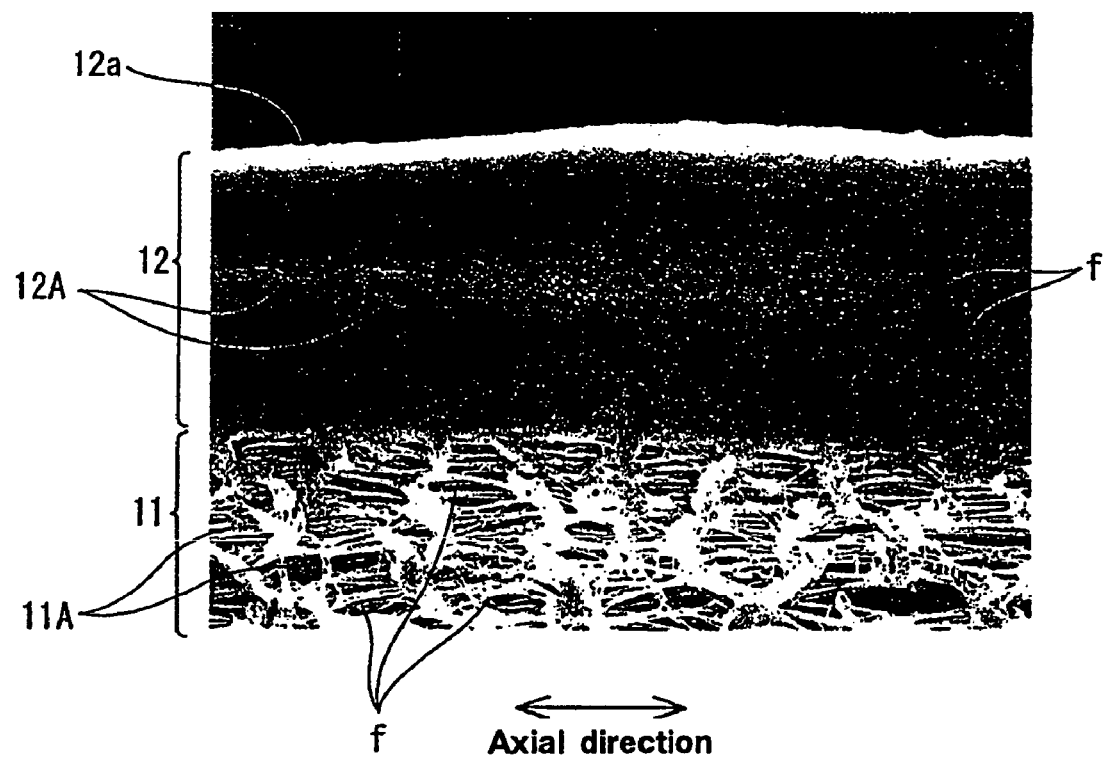
FIG. 4 is a magnified (500 times) photograph showing a portion near the internal circumference of an axial cross-section of a porous multilayered hollow fiber, which is an example of the present invention.
Figure 5:
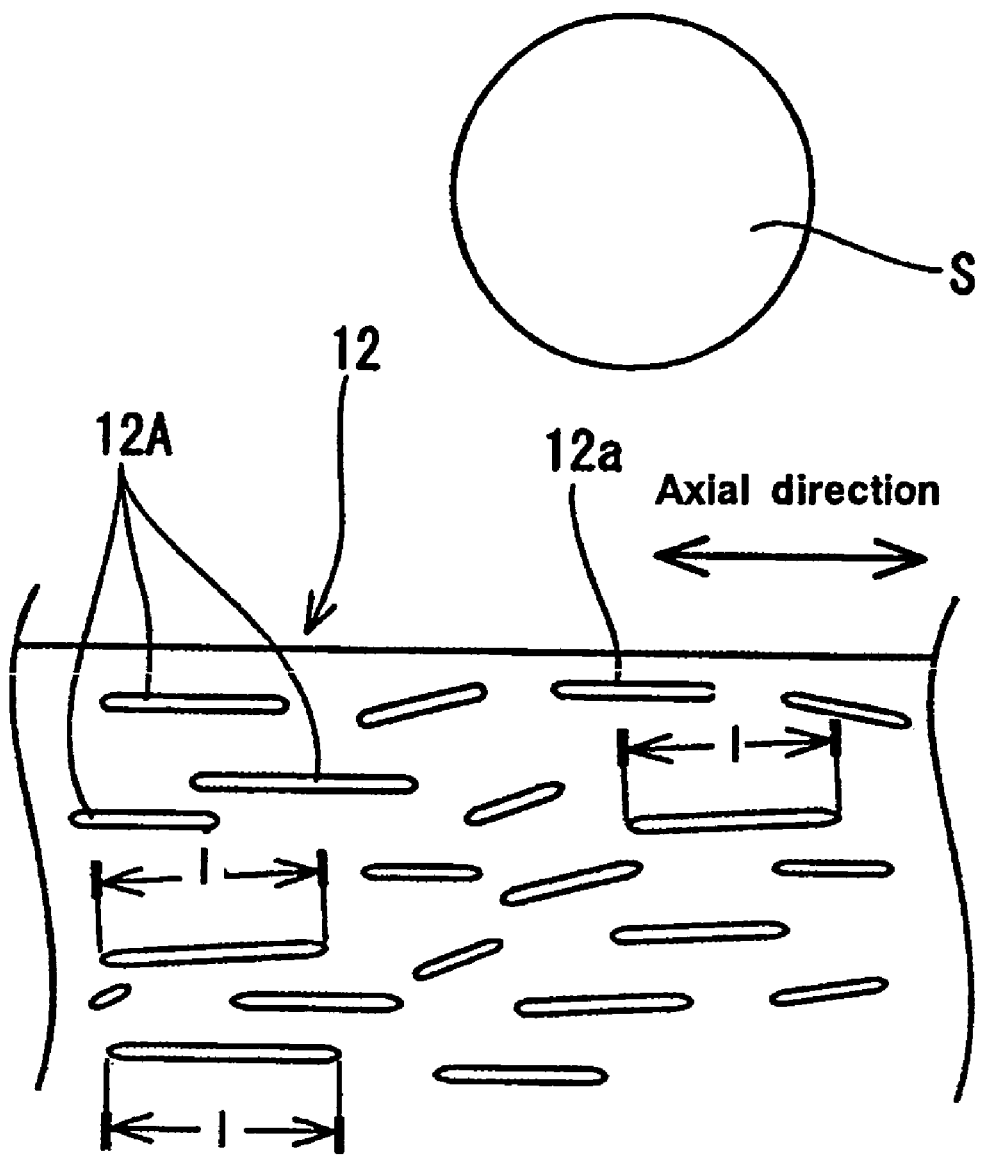
FIG. 5 is a schematic diagram showing a solid particle, which is to be subjected to fluid-solid separation processing, and maximum cross-dimensions (l) of pores in the outer surface of the filtration layer.

FIG. 3 is a magnified photograph (100 times) of an axial section (including the internal surface of the supporting layer 11) of the porous multilayered hollow fiber 10. The thin layer of the outermost layer on the photograph is a section of the filtration layer 12, and the layer under it is a section of the supporting layer 11. The lower part of the photograph is an internal surface 11b of the supporting layer 11. Also, FIG. 4 is a further magnified photograph (500 times) of an axial section of the porous multilayered hollow fiber 10. The section of the filtration layer 12 is shown at the upper part of the photograph, and a partial section of the supporting layer 11 is shown on the lower part of the photograph. As shown in the figure, the porosity and pore size of the supporting layer 11 are greater than those of the filtration layer 12, in which the pore size is very small.

Although there are various shapes, such as a slit form, elliptical shape, etc. intermingled in the pores 11A and 12A surrounded by the fibrous frameworks, slit-shaped pores which have a greater dimension in the longitudinal direction as compared to the width direction exist mainly because the polytetrafluoroethylene tube and the polytetrafluoroethylene sheet, which constitute the supporting layer 11 and filtration layer 12, respectively, are both expanded: more specifically, the polytetrafluoroethylene tube is expanded by 500% in one axial direction of the tube, and the polytetrafluoroethylene sheet is expanded in two directions, by 200% in the axial direction and 1000% in the transverse direction.

In the present invention, RFL (i.e., Relative Fibril Length) (Y) is a value obtained by dividing the mean of maximum fibril length (L) (μm) of the fibrous frameworks, which surround each pore 12A in the outer surface 12a of the filtration layer 12, by the particle diameter (X)(μm) of captured particles in the case where the particle trapping ratio is equal to or more than 90% when filtration is performed under the elevated pressure of 0.1 MPa. That is, the structure of filtration layer 12 is defined by (Y=L/X).

As shown in FIG. 1, the above-mentioned (L) is set such that (X) and (Y) fall within the region M (the part indicated by slanted lines in the figure) which is defined by linking the following 10 points A to J on the XY plane in the enumerated order: (X, Y)=point A (0.055, 2), point B (1, 1.5), point C (2, 1), point D (5, 0.5), point E (10, 0.3), point F (10, 4), point G (5, 6), point H (2, 10), point I (1, 15), point J (0.055, 25).

Thus, (L) is designed to be sufficiently small so that solid particles to be separated in the steady state after the early stage of the solid-liquid separation treatment may not be captured into pores 12A. That is, the mean of maximum fibril length (L) of the fibrous frameworks which surround respective pores 12A in the outer surface 12a of the filtration layer 12 is set to a length such that numerous solid particles in a solution can be blocked at the outer surface 12a of the filtration layer 12 and the solid particles do not irreversibly enter into the pores 12A of the filtration layer 12 and the pores 11A of the supporting layer 11.

Thus, the mean of maximum fibril length (L) of the fibrous frameworks which surround respective pores 12A which exist in the outer surface 12a of the filtration layer 12 is set to be equal to or less than 2.5 µm, and the filtration layer 12 is structured such that the particle trapping ratio is 90% in the case where beads as the captured particles having a particle diameter (X) of 0.2 µm are filtered under an elevated pressure of 0.1 MPa, and RFL (Y) becomes 12.5. (X,Y)=(0.2, 12.5) exists in the region M.

The area occupation rate of the pores 12A relative to the whole peripheral surface area of the outer surface 12a is 50% in the outer surface 12a of the filtration layer 12. The mean maximum length of the pores 11A which exist in the supporting layer 11 is in the range of about 20 µm to 50 µm. The area occupation rate and the mean of maximum fibril length (L) of the fibrous frameworks which surround each of pores in the surface of the filtration layer are calculated from an electron micrograph by hand calculation or calculation in an image processing program.

The porosity of the filtration layer 12 is designed to be 60% and the porosity of the supporting layer 11 is 80%. The thickness of the filtration layer 12 is 60 µm, and the thickness of the supporting layer 11 is 0.5 mm. The inner diameter of the tube is 1 mm.

The porous multilayered hollow fiber 10 of the first embodiment is a membrane for filtration to remove dirt ingredients in draining, and the average particle diameter of solid particles to be collected and separated by fluid-solid separation of the dirt ingredients is in the range of about 0.1 µm to 5 µm.

Thus, the porous multilayered hollow fiber 10 is a porous tube for pressure filtration, in which the outermost layer is the filtration layer 12, and the mean of maximum fibril length (L) of the fibrous frameworks which surround each of the pores 12A existing in the outer surface 12a of the filtration layer 12 is set as described above. Therefore, most of solid particles S in a solution can be repulsed at the outer surface 12a of the filtration layer 12, and solid particles are prevented from irreversibly entering into the pores 12A of the filtration layer 12 and the pores 11A of the supporting layer 11. Consequently, the clogging does not occur, and it is possible to allow only filtering liquid to pass through the inside of the filtration layer 12 and the supporting layer 11. Therefore, the degradation of flow rate which accompanies an elapse of time can be prevented, and the flow rate variation between the early stage condition and the steady state hardly occurs, and satisfactory filtration property can be maintained for a long time.

Also, it is possible to easily remove the solid particles S which have adhered to the outer surface 12a of the filtration layer 12 and to recover the filtration property easily after use of a certain period by performing back wash reverse filtration in which a fluid is caused to flow toward the outer surface 12a side of the filtration layer 12 from the internal surface 11b side of the supporting layer 11 in the porous multilayered hollow fiber 10.

In the above-mentioned embodiment, the resin constituting the filtration layer is polytetrafluoroethylene. However, it may be a resin selected from the group consisting of a polyolefin group resin, such as polyethylene and polypropylene, and polyimide or poly vinylidene fluoride group resin. It is sufficient if the supporting layer and the filtration layer are both expanded at least in one axial direction, and taking the expanding balance into consideration, the expansion of one or two axes in the axial or circumferential direction of the tube can be appropriately performed. The filtration layer may be made of an extrusion molded tube.

Figure 7:
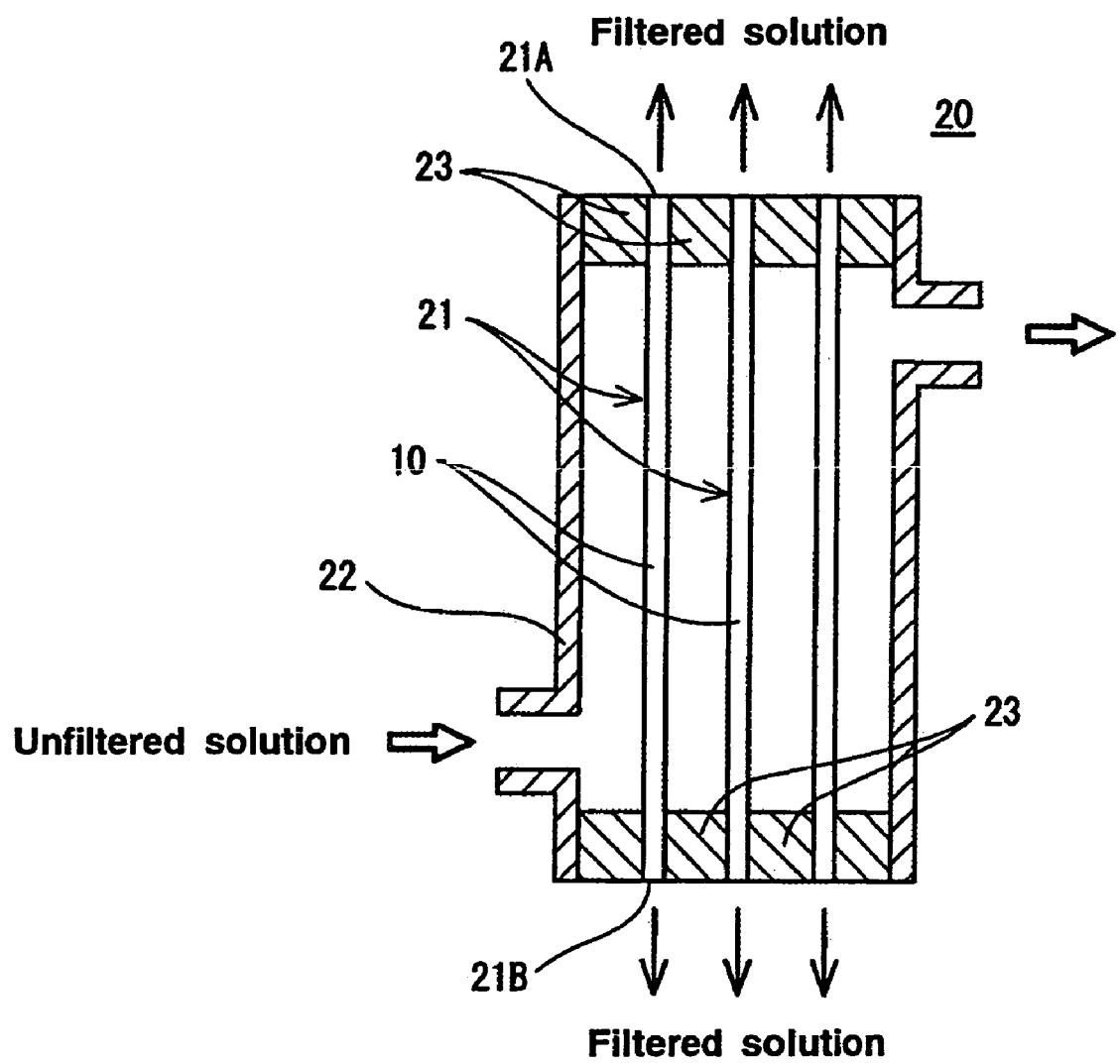
FIG. 7 is a schematic diagram showing an example of structure of a filtration module according to the present invention.

FIG. 7 shows a filtration module 20 which is composed of a bundled unit consisting of a plurality of porous multilayered hollow fibers 10. The filtration module 20 is used for outer side pressed filtration, and is provided with a bundle 21 consisting of a plurality of porous multilayered hollow fibers 10 bundled together. The bundle 21 is housed in an outer pipe 22 and the gaps among the porous multilayered hollow fibers 10 are sealed by a sealing resin 23 at both edges 21A and 21B of the bundle 21. Similarly, the gaps between the outer pipe 22 and both edges of 21A and 21B of the bundle 21 are also sealed by the sealing resin 23.

Both ends of the filtration module 20 are open except the sealed portion in the opening, and as shown by the arrows in the figure, an unfiltered solution to be subjected to fluid-solid separation processing is supplied from a side of outer pipe 22, and filtered by the porous multilayered hollow fibers 10 while flowing therethrough toward the upper end 21A side of the bundle 21 and the bottom end 21B side of the bundle 21. The filtered solution in which solid particles have been removed flows through the hollows inside of the internal circumference of the porous multilayered hollow fibers 10 and is discharged from the side from the upper end 21A side of the bundle 21 and the bottom end side 21B of the bundle 21. The liquid containing solid particles is discharged, as shown in the arrow in the figure, from a discharge orifice provided in the outer pipe 22. Also, a filtration module for dip-type outer side pressed suction filtration can be made, using a bundled unit consisting of a plurality of porous multilayered hollow fibers 10.

As described above, the filtration module 20, which is equipped with a plurality of porous multilayered hollow fibers 10 of the present invention, is capable of high precision filtration. It is suitable for outer side pressed filtration or dip-type suction filtration, in particular.

Figure 8:
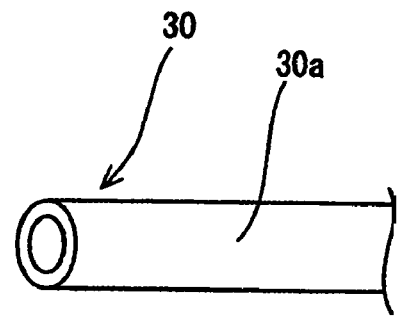
FIG. 8, including FIGS. (A), (B), (C), and (D), is a schematic diagram showing a manufacturing method of the porous multilayered hollow fiber of the present invention.
Figure 8:
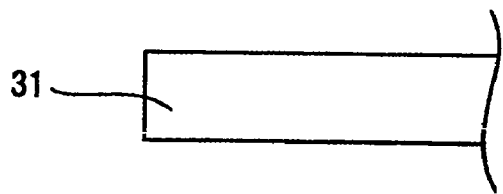
Figure 8:
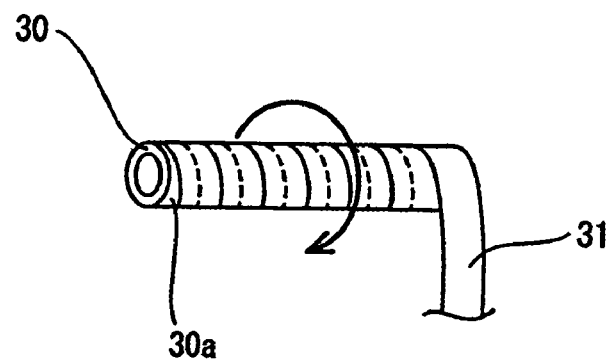
Figure 8:
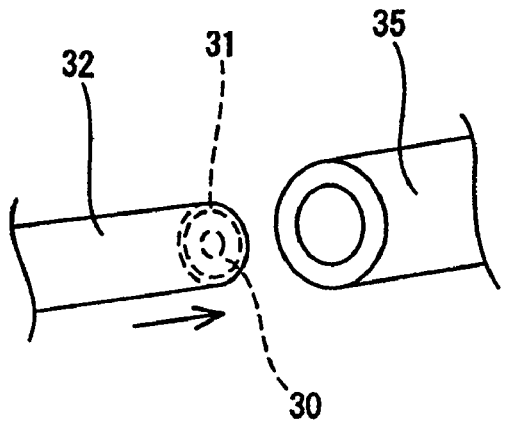

Hereinafter, the manufacturing method of the porous multilayered hollow fiber of the present invention is described in detail in reference to FIG. 8.

First, a porous expanded polytetrafluoroethylene tube 30 produced by extrusion molding is prepared. The porous expanded polytetrafluoroethylene tube 30 is expanded at an given expansion ratio without filly sintering the outer surface 30a of the tube.

Microscopic unevenness of about 100 µm is uniformly afforded by applying flame treatment to the whole surface of the outer surface 30a of the porous expanded polytetrafluoroethylene tube 30, which is expanded in the state where the outer surface 30a is unsintered. The conditions of the flame treatment, which is applied to the whole surface of the outer surface 30a, are propane gas 1.2 L/min, air 11 L/min, and speed 1.7 m/min.

Then, a porous expanded resin sheet 31 is prepared. This porous expanded sheet is made of polytetrafluoroethylene and expanded at a given expansion ratio without fully sintering it. The expanded porous sheet 31 has an elongated rectangular shape of width 10 mm and thickness 30 μm.

Subsequently, the unsintered porous expanded resin sheet 31 is wound spirally and in overlapping manner on the outer surface 30a of the porous expanded polytetrafluoroethylene tube 30 such that the porous expanded resin sheet 31 covers the whole surface area of the outer surface 30a.

After such winding process, the stacked body 32 consisting of the porous expanded polytetrafluoroethylene tube 30 and the porous expanded resin sheet 31 is put through a die 35 whose inner diameter is φ1.8 mm, and a load of about 0.5 kgf is applied uniformly to the whole circumferential surface of the stacked body 32 in the radial direction of the tube so that the sheet 31 and the tube 30 are adhered together.

In such adhered state, the porous expanded polytetrafluoroethylene tube 30 and the porous expanded resin sheet 31 are sintered for 20 minutes at 350° C., which is a temperature above the melting point of the porous expanded polytetrafluoroethylene tube 30 and the porous expanded resin sheet 31 (the melting point of polytetrafluoroethylene is about 327° C.) so that they are completely united.

As described above, since microscopic unevenness is provided to the outer surface 30a of the porous expanded polytetrafluoroethylene tube 30, the displacement of porous expanded polytetrafluoroethylene tube 30 and porous expanded resin sheet 31 does not occur. Moreover, floating of the porous expanded resin sheet 31 can be prevented because satisfactory adherence is attained with the application of a load. Thus, it is possible to unite them in excellent adhering condition.

For example, the porous expanded polytetrafluoroethylene tube may be produced as follows: a polytetrafluoroethylene fine powder to which a fluid lubricator such as naphtha is blended is formed into a tubular shape by extrusion molding or the like; and without removing the fluid lubricator or after removing the fluid lubricator by dry removal, it is expanded at least in one axial direction. It is possible to produce a porous expanded polytetrafluoroethylene tube having improved strength and pore diameter in the range of about 0.1 to 10 μm when such expanded structure is sintered by heating it, under heat-shrink prevention condition, to a temperature of equal to or more than about 327° C. of the sintering temperature. As for the porous expanded polytetrafluoroethylene tube and the porous expanded resin sheet, materials which are already sintered may be used.

Also, the porous expanded polytetrafluoroethylene sheet can be obtained by the following various known methods: ① an unsintered body which is formed of polytetrafluoroethylene by paste extrusion method is expanded at a temperature below the melting point, and sintered thereafter; ② a sintered polytetrafluoroethylene shaped body is cooled slowly, and after enhancing crystallization thereof, uniaxial expansion is applied thereto at a given expansion ratio; ③ an unsintered body which is formed of a polytetrafluoroethylene fine powder by paste extrusion is subjected to heat treatment such that the variation of the endothermic peak of the fine powder does not occur on a DSC Trace chart of a differential scanning calorimeter, and the specific gravity of the formed body becomes equal to or more than 2.0, and thereafter it is expanded at a temperature below the melting point of the powder; ④ a formed body produced by paste extrusion of a polytetrafluoroethylene fine powder whose number-averaged molecular weight is equal to or less than 1,000,000 is enhanced in terms of crystallinity by heat-treating after sintering, and thereafter it is expanded at least in one axial direction. As described above, a sheet form can be achieved by extruding with a paste extrusion machine, or pressing with a calender roller, or by flatting after an extrusion process. When other resins are used, porous expanded sheets can be obtained in a similar method.

Preferably, the polytetrafluoroethylene fine powder has a number-averaged molecular weight of equal to or more than 500,000, and more preferably, 2,000,000 to 20,000,000. In the paste extrusion method, it is preferable to perform an extrusion molding by blending 15 to 40 weight parts of fluid lubricator to 100 weight parts of polytetrafluoroethylene.

As for the expansion process, a sheet-form or tubular porous material can be expanded by stretching them mechanically according to a usual method. For example, in the case of a sheet, stretching can be made by making take-up speed greater than feed speed when rolling it up from one roll to another roll, or by stretching the sheet in a manner such as to expand the interval between the two points where it is grasped. In the case of a tube, it is easy to stretch it in the longitudinal direction (axial direction) thereof. Besides, it is possible to expand with various expansion methods, such as multi-stage stretching, sequential biaxial stretching, simultaneous biaxial stretching. An expansion is generally performed at a temperature (about 0° C.-300° C.) below the melting point of the sintered body. For obtaining a porous body having comparatively large pore size and high porosity, expansion at low temperature is preferable, and for obtaining a densely porous body having comparatively small pore size, expansion at high temperature is preferable. An expanded porous material may be used just as it is. When high dimensional stability is required, it may be heat-treated for about 1 to 30 minutes at a temperature in the range of 200° C. to 300° C. while the tension for expansion is maintained by holding both ends of the expanded body, or by other suitable method. The dimensional stability can be enhanced by sintering in a heating furnace for tens of seconds to several minutes at a temperature equal to or above the melting point of the fine powder, for example, at a temperature in the range of about 350° C. to 550° C. The maximum cross dimension of the pores, and other factors can be adjusted by combining the condition of expansion temperature, the crystallinity and expansion ratio of polytetrafluoroethylene, and the like, as described above.

In the above-mentioned embodiment, approximately semi-circular lapping is done using two sheets. However, one or more than two sheets may be used. Also, a sheet may be wound once or twice around the outer periphery of a tube, and a filtration layer may be formed of single layer or multi-layer.

It is easy to wind a porous expanded resin sheet on the outer surface of a tube if the porous expanded resin sheet is expanded uniaxially in the axial direction of the tube. The shape of a porous expanded resin sheet may be set according to the winding situation, and it may be applied by winding spirally relative to the axial direction of the tube.

In the above-mentioned embodiment, a load is applied after the process of winding a sheet. However, the load may be applied by affording a tension to a sheet while the sheet is wound.

Hereinafter, some examples of the porous multilayered hollow fiber of the present invention, and comparative examples are described in detail.

EXAMPLE 1

A porous multilayered hollow fiber according to the present invention was produced. The supporting layer was made of a porous expanded polytetrafluoroethylene tube having an inner diameter of 1 mm and outer diameter of 2 mm, porosity of 80%, average maximum fibril length of 40 μm. The catching performance of the supporting layer was 90% when beads having particle diameter of 2 μm were used as captured particles at a filtration pressure of 0.1 MPa.

A porous expanded polytetrafluoroethylene sheet which was used as a filtration layer had a thickness of 30 μm, width of 10 mm, porosity of 60%, the mean of maximum fibril length (L) of the fibrous frameworks, which surround each pore in the outer surface of the filtration layer, being 2.5 μm. The catching performance of the filtration layer was 90% when beads having particle diameter (X) of 0.2 μm were used as the captured particles at the filtration pressure of 0.1 MPa. That is, Relative Fibril Length (Y) is 12.5, and (X, Y)=(0.2, 12.5) exists in the region M.

The porous expanded polytetrafluoroethylene tube and the porous expanded polytetrafluoroethylene sheet were set in lapping equipment of exclusive use. The porous expanded polytetrafluoroethylene tube was proceeded at a linear speed of 2 m/minute, and the porous expanded polytetrafluoroethylene sheet was continuously lapped around the tube while tension control is applied. The lapping was performed at half lapping.

After that, the product thus produced was passed through a tunnel kiln in which the ambient air temperature was set to 350° C., and the porous expanded polytetrafluoroethylene tube and the porous expanded polytetrafluoroethylene sheet were united by hot-melt adhesion, whereby a porous multilayered hollow fiber was produced. The porosity of the whole porous multilayered hollow fiber after forming was 68%. The mean of maximum fibril length (L) of the fibrous frameworks, which surround each pore in the outer surface of the filtration layer was 2.5 μm when measured with SEM. The characteristics of the porous multilayered hollow fiber is shown in the following table 1.

EXAMPLE 2

A porous multilayered hollow fiber of the present invention was produced.

The porous expanded polytetrafluoroethylene tube which was used as a supporting layer had an inner diameter of 1 mm, outer diameter of 2 mm, porosity of 80%, the mean of maximum fibril length (L) of the fibrous frameworks, which surround each pore in the outer surface of the filtration layer being 40 μm. The catching performance of the supporting layer was 90% when beads having a particle diameter of 2 μm were used as the captured particles at a filtration pressure of 0.1 MPa.

A porous expanded polytetrafluoroethylene sheet which was used as a filtration layer had a thickness of 30 μm, width of 10 mm, porosity of 75%, and the mean of maximum fibril length (L) of fibrous frameworks which surround pores being 15 μm. The catching performance of the filtration layer was 90% when beads having particle diameter (X) of 5 μm were used as the captured particles at a filtration pressure of 0.1 MPa.

That is, RFL (Y) was 3, and (X, Y)=(5, 3) exists in the region M.

COMPARATIVE EXAMPLE 1

A porous expanded polytetrafluoroethylene tube which was used as an unitary membrane filtration layer had an inner diameter of 1 mm, outer diameter of 2 mm, and the mean of maximum fibril length (L) of the fibrous frameworks, which surround each pore in the outer surface of the filtration layer being 15 μm. The catching performance was 90% when beads having a particle diameter (X) of 0.2 μm were used as the captured particles at the filtration pressure of 0.1 MPa. That is, RFL (Y) is 75, and (X, Y)=(0.2, 75) is located outside of the region M.

COMPARATIVE EXAMPLE 2

A porous expanded polytetrafluoroethylene tube which was used as an unitary membrane filtration layer had an inner diameter of 1 mm, outer diameter of 2 mm, porosity of 80%, and the mean of maximum fibril length (L) of the fibrous frameworks, which surround each pore in the outer surface of the filtration layer being 60 μm. The catching performance was 90% when beads having a particle diameter (X) of 5 μm were used as the captured particles at the filtration pressure of 0.1 MPa. That is, RFL (Y) is 12, and (X, Y)=(5, 12) is located outside of the region M.

TABLE I

| Porous multilayered hollow fiber | Example 1 | Comparative example 1 | Example 2 | Comparative example 2 |
| --- | --- | --- | --- | --- |
| Inner diameter (mm) | 1.0 | 1.0 | 1.0 | 1.0 |
| Outer diameter (mm) | 2.0 | 2.0 | 2.0 | 2.0 |
| Porosity (%) | 68 | 45 | 75 | 80 |
| Average maximum fibril length (SEM) (μm) | 2.5 | 15 | 15 | 60 |
| Bubble point (IPA) (kPa) | 110 | 90 | 10 | 10 |

Figure 9:
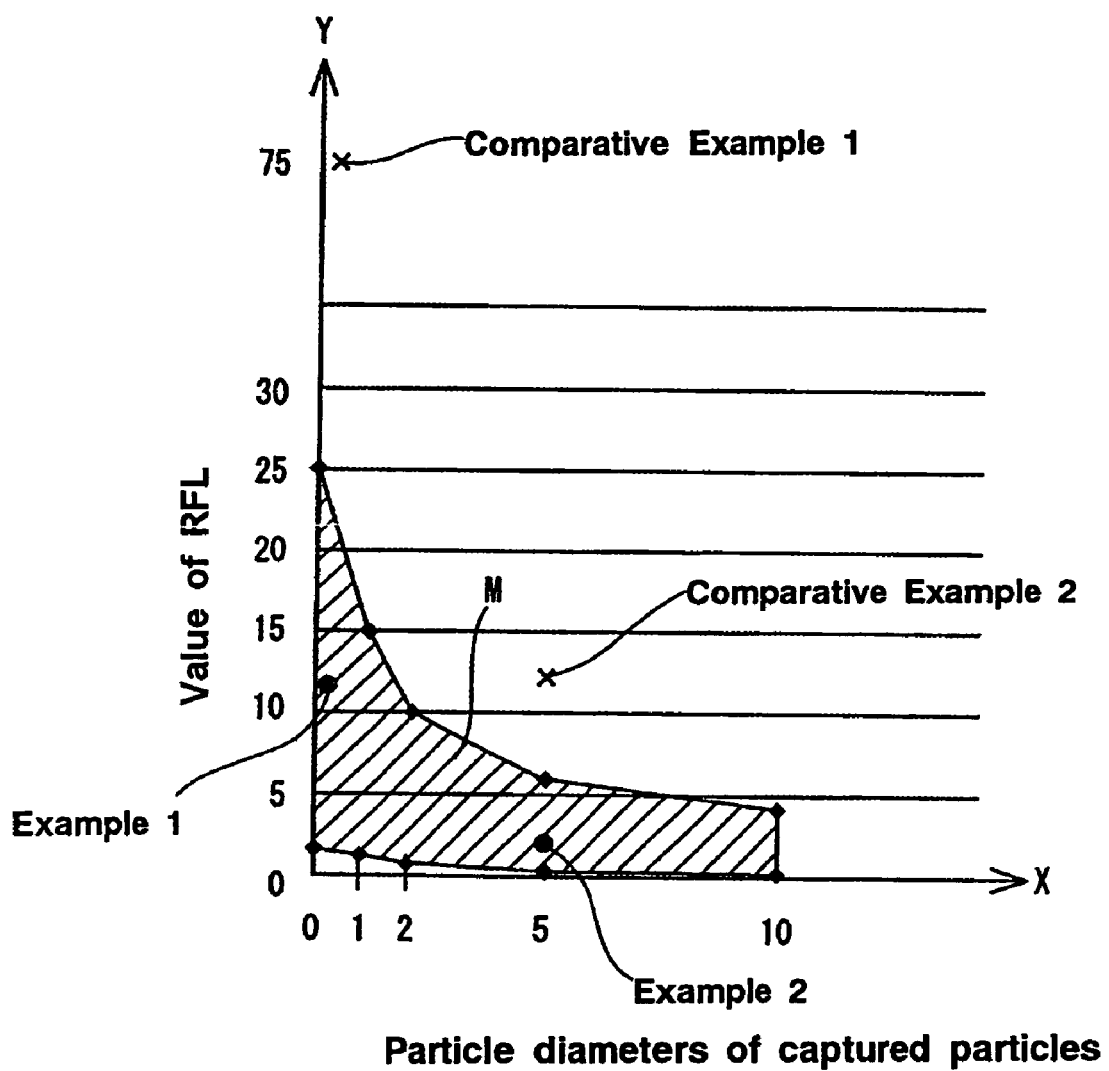
FIG. 9 is a graph showing the relationship between (X,Y) and the region M, with respect to the examples of the present invention and the comparative examples.

The relationship between each value of (X, Y) and the region M in Examples 1 and 2 and Comparative Examples 1 and 2 is shown in FIG. 9.

In Examples 1 and 2 the values of (X, Y) exist within the region M.

Figure 10:
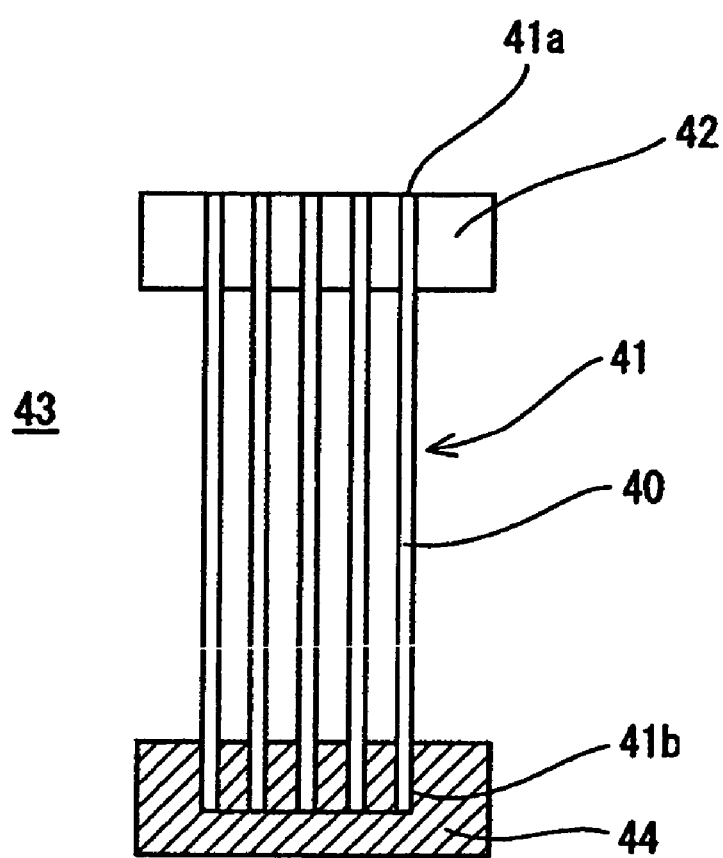
FIG. 10 is a schematic diagram of the filtration module used in the examples of the present invention and the comparative examples.

As shown in FIG. 10, each of bundles 41 was made by bundling 20 pieces of porous multilayered hollow fibers 40 shown in Table I, and they were united into one collected bunch by epoxy resin 42 at one end 41a side, and thereby filtration modules 43 were produced. At the other end side 41b, sealing 44 was provided by heat sealing.

Figure 11:
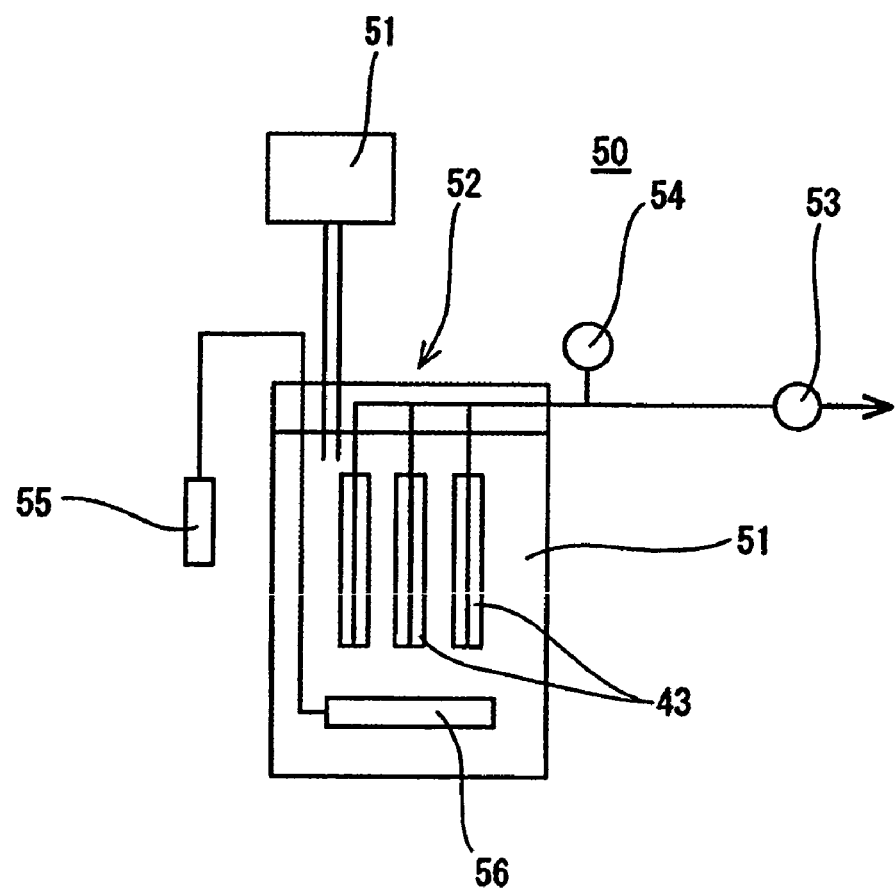
FIG. 11 is a schematic diagram illustrating the structure of a filtration testing apparatus used in the examples of the present invention and the comparative examples.

An filtration experiment was conducted using a filtration testing apparatus 50 shown in FIG. 11 with respect to filtration modules 43 in which the respective porous multilayered hollow fibers 40 were used. The filtration testing apparatus 50 had a structure in which the filtration modules 43 were immersed in an unfiltered solution 51 which was supplied into filtration tank 52. The solution filtered by filtration modules 43 was sucked with a suction pump 53 so as to be discharged from the filtration tank 52.

A vacuum gauge 54 was installed between the suction pump 53 and the filtration modules 43. An air diffusion pipe 56, which was connected to a blower 55, was immersed in the filtration tank 52 so that it could diffuse air into the unfiltered solution 51 in the filtration tank 52.

EXPERIMENT 1 EXAMPLE 1, COMPARATIVE EXAMPLE 1

A filtration test was conducted under the following conditions: prescribed filtration flow rate was 0.3 m/day; the water temperature was 20° C. to 28° C. (the graph of FIG. 12 mentioned later shows 25° C. correction values). Also, back wash reverse filtration was performed for 30 seconds each at the frequency of once/30 minutes, and under 100 kPa pressure. The air diffusion was done once/30 minutes with an aerial quantity of 20 L/min.

(Unfiltered Solution)

A filtration treatment was performed under the condition in which an activated carbon powder was added, by quantity to become 10 mg/L, to untreated water, which has been taken from a clarifying facility, so as to cause dissolved organic matters in the untreated water to adsorb thereto. The particle diameter of the activated carbon powder was in the range of 5 to 10 μM. Also, a sodium hypochlorite solution (30 mg/L) was added intermittently to prevent the propagation of bacteria.

Figure 12:
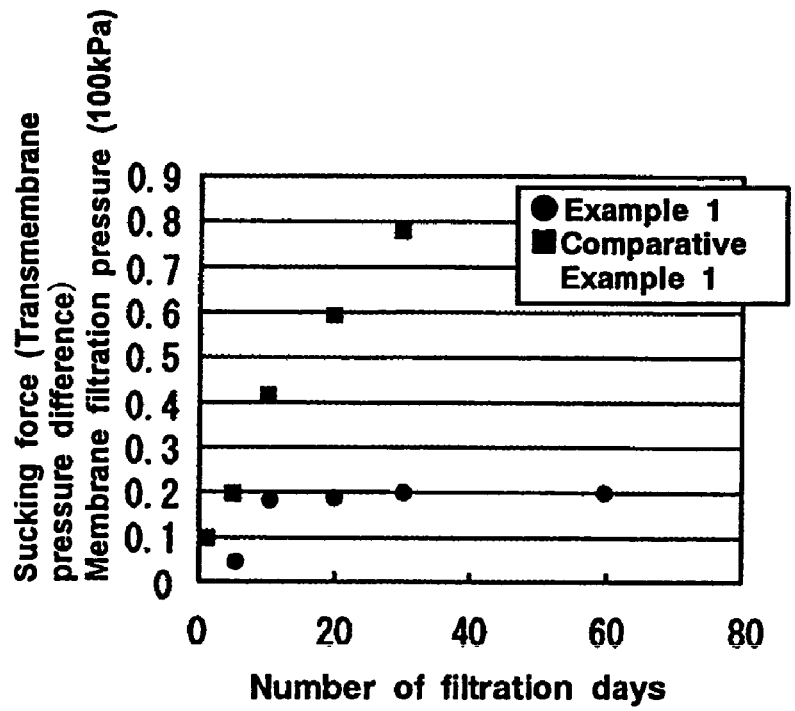
FIG. 12 is a graph showing the results of the filtration experiment in Example 1 and Comparative Example 1, and the relationship between the elapsed days and the transmembrane pressure difference.

FIG. 12 shows the relationship between elapsed days and transmembrane pressure difference (sucking force) of a filtration experiment in which the filtration modules of Example 1 and Comparative Example 1 were used. Pressure was adjusted so as to achieve a constant flow rate (0.3 m/day) by implementing quantitative flow operation. When dogging occurs, the value of transmembrane pressure difference increases. As for the property of processing water, the untreated water had turbidity of 15, and the filtered water after filtration processing exhibited turbidity of 0 in both examples.

As shown in Table I and FIG. 12, in the case of Example 1, the mean of maximum fibril length (L) of the fibrous frameworks, which surround each pore in the outer surface of the filtration layer is 2.5 μm, that is, a length which substantially does not cause particles to be unreversibly trapped into the pores in the filtration layer in a steady state after the degradation of flow rate at the early stage has ended. Thus, it was confirmed that stable satisfactory filtration property was maintained after some time elapse; although the value of the transmembrane pressure difference was rather great for the initial period of about 8 to 10 days after the commencement of filtration, thereafter the transmembrane pressure difference became constant at a value of approximately 20 kPa.

On the other hand, in the case of Comparative Example 1, the mean of maximum fibril length (L) of the fibrous frameworks which surround pores was 15 μm, which is a sufficiently great length to allow solid particles to enter into pores, the value of the transmembrane pressure difference increased as days elapsed, and the clogging also deteriorated gradually with the elapse of time, and the degradation of the filtration property was great. Also, the bubble point value of Example 1 was large as compared to Comparative Example 1.

EXPERIMENT 2 EXAMPLE 2, COMPARATIVE EXAMPLE 2

As for the filtration condition, the filtration flow rate was designed to be 0.6 m/day, and the water temperature was set in the range of 25° C. to 27° C. (the graph of FIG. 13 mentioned later shows 25° C. correction values). The back wash reverse filtration was performed under a pressure of 100 kPa for 30 seconds in the frequency of once/30 minutes. The air diffusion was performed always at an aerial quantity of 20 L/min.

(Unfiltered solution)

Activated sludge (MLSS 10000 mg/L) for the drainage processing was used.

Figure 13:
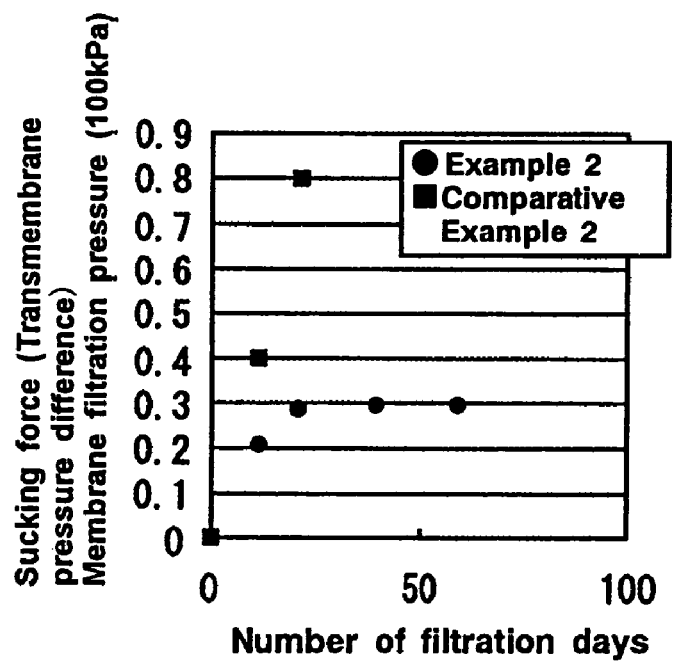
FIG. 13 is a graph showing the result of the filtration experiment of Example 2 and Comparative Example 2, and the relationship between the elapsed days and the transmembrane pressure difference.

FIG. 13 shows the relationship between elapsed days and transmembrane pressure difference (sucking force) in a filtration experiment which used the filtration modules of Example 2 and Comparative Example 2.

The pressure was adjusted by implementing quantitative flow operation so that the flow rate (0.6 m/day) became constant. When clogging occurred, the value of the transmembrane pressure difference increased. As for the property of processed water, the untreated water had turbidity of 20, and the filtered water after filtration processing exhibited turbidity of 0 in both examples.

As shown in Table I and FIG. 13, in the case of Example 2, the mean of maximum fibril length (L) of the fibrous frameworks which surround the pores of the outer surface in the filtration layer was set to 15 μm, which was a length that would not cause particles to be captured unreversibly into the pores of the filtration layer in the steady state after the degradation of flow rate in the early stage has ended. Thus, the value of the transmembrane pressure difference was rather great for the initial period of about 8 to 10 days after the beginning of filtration, but thereafter the transmembrane pressure difference became constant with a value of approximately 30 kPa. Thus, it was confirmed that satisfactory filtration property was stably achieved after an elapse of some time.

On the other hand, in the case of Comparative Example 2, since the mean of maximum fibril length (L) of the fibrous frameworks, which surround each pore in the outer surface of the filtration layer, was 60 μm, solid particles entered into pores as days elapsed, the value of the transmembrane pressure difference increased, and dogging deteriorated gradually with the elapse of time, whereby the degradation of the filtration property became great. The value of bubble point in Example 1 was greater than that of Comparative Example 1.

What is clamed is:

1. A porous multilayered hollow fiber for outer side pressed filtration of solid-liquid separation treatment, the filtration being performed from the outer surface side thereof toward the internal surface side, comprising:
    a supporting layer constituted of an expanded porous polytetrafluoroethylene tube (PTFE), and a filtration layer including a porous polytetrafluoroethylene (PTFE) sheet formed by expanding a resin uniaxially or biaxially apart from the supporting layer, the filtration layer being adhered to the outer surface of the supporting layer to form a multilayered body, and pores in the supporting layer three-dimensionally communicating with pores in the filtration layer,
    wherein pores surrounded by fibrous frameworks in the filtration layer are smaller than those of the supporting layer, and
    the mean maximum length of pores (L) in the outer surface of the filtration layer is designed such that (X) and (Y) fall within the range defined by plotting the following 10 points on the XY plane, where (X) is a particle diameter of particles captured when the particle trapping ratio is equal to or more than 90% in the case where the filtration is done under an elevated pressure of 0.1 MPa, and (Y) is a value designated as RFL obtained by dividing (L) by (X), that is, (Y=L/X): (X,Y)=(0.055, 2) (1, 1.5) (2, 1) (5, 0.5) (10, 0.3) (10, 4) (5, 6) (2, 10) (1, 15) (0.055, 25).

2. A manufacturing method of a porous multilayered hollow fiber, comprising the steps of:

affording an unevenness of 20-200 μm to the outer surface of a porous expanded polytetrafluoroethylene tube by flame treatment, laser irradiation, or plasma irradiation;

lapping a porous expanded resin sheet around the outer surface of said porous expanded polytetrafluoroethylene tube;

adhering said porous expanded polytetrafluoroethylene tube and said porous expanded resin sheet together by providing a load thereto after or during such lapping process; and sintering such adhered tube and resin sheet so as to unite them into a unified body.

3. A porous multilayered follow fiber according to claim 1, wherein the mean maximum length of pores in said filtration layer is 1% to 30% of the mean maximum length of pores in said supporting layer.

4. A filtration module for outer side pressed filtration or dip-type outer side pressed suction filtration, comprising a bundle consisting of a plurality of porous multilayered hollow fibers according to claim 1.

* * * * *